United States Patent [19]

Angus et al.

[11] Patent Number: 4,829,539
[45] Date of Patent: May 9, 1989

[54] TEMPERATURE THERMAL HISTORY INDICATING DEVICE

[75] Inventors: James P. Angus; Derek Salt, both of Derby, England

[73] Assignee: Rolls-Royce plc, London, England

[21] Appl. No.: 144,177

[22] Filed: Jan. 15, 1988

[30] Foreign Application Priority Data

Mar. 31, 1987 [GB] United Kingdom ............... 8707683

[51] Int. Cl.$^4$ ............................................. G01K 11/06
[52] U.S. Cl. .................................... 374/159; 374/162; 376/247; 405/128
[58] Field of Search ................... 374/161, 162; 405/53; 376/247

[56] References Cited

U.S. PATENT DOCUMENTS

| | | | |
|---|---|---|---|
| 1,894,015 | 1/1933 | Bernstein | 374/162 X |
| 2,945,305 | 7/1960 | Strickler | 374/162 X |
| 2,978,584 | 4/1961 | Loconte et al. | 374/162 X |
| 3,260,112 | 7/1966 | Godbey et al. | 374/162 X |
| 3,696,675 | 10/1972 | Gilmour | 374/162 |
| 4,320,028 | 3/1982 | Leuchfay | 405/128 X |
| 4,538,926 | 9/1985 | Chretien | 374/162 X |
| 4,696,580 | 9/1987 | Kameda | 374/162 |

FOREIGN PATENT DOCUMENTS

| | | |
|---|---|---|
| 0138741 | 4/1985 | European Pat. Off. |
| 1440292 | 6/1976 | United Kingdom |
| 1511357 | 5/1978 | United Kingdom |
| 1597388 | 9/1981 | United Kingdom |
| 2135081 | 8/1984 | United Kingdom |

Primary Examiner—Daniel M. Yasich
Attorney, Agent, or Firm—Cushman, Darby & Cushman

[57] ABSTRACT

A temperature indicating device which comprises a plurality of panels in a fixed array. Some of the panels are adapted to undergo a reversible change in appearance at a given temperature whereas the remainder are adapted to undergo irreversible change in appearance at a given temperature. The device is useful in indicating the temperature which an object has achieved as well as its actual temperature.

6 Claims, 1 Drawing Sheet

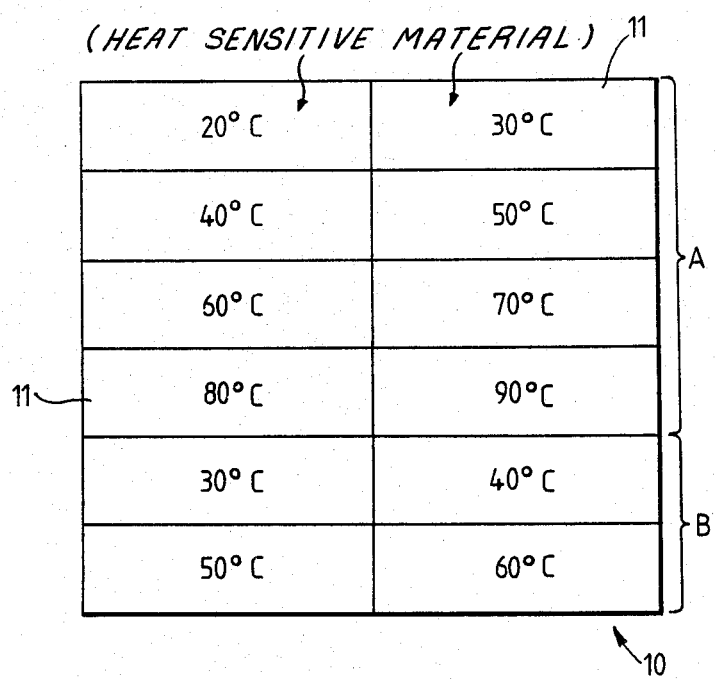

TEMPERATURE THERMAL HISTORY INDICATING DEVICE

This invention relates to a temperature indicating device.

There is frequently a requirement for a device which is capable of indicating both the current temperature of an object in a given environment, and the thermal history of that object i.e. an indication of the temperatures which the object has reached over a given time period. In most circumstances, this requirement can be satisfied by conventional temperature indicating and recording devices. However if the object of interest is situated in a hostile environment, the use of such conventional devices is often precluded.

By way of example, one type of hostile environment which has proved to be particularly troublesome in this respect is that in which radioactive waste is encapsulated prior to its disposal. The waste, which may be Magnox swarf, barium carbonate slurry etc, is usually encapsulated in steel drums using an encapsulation grout. The chemical reaction which takes place during encapsulation is exothermic so that as the reaction proceeds, the drum temperature increases to a peak value whereupon it progressively decreases to the ambient temperature. The temperatures of the drums must be monitored during the encapsulation process so that firstly it is known whether the exothermic reaction has taken place and secondly if so whether the temperatures of the drums have fallen to a predictable value, given the ambient temperature.

During the exothermic process, the drums are necessarily situated in an environment which prevents the escape of radioactive contamination. This makes it very difficult to use conventional equipment which inevitably must be removed from the environment for servicing purposes.

It is an object of the present invention to provide a device for monitoring the instant temperature and thermal history of an object which can be remotely monitored and which is sufficiently cheap to be discarded after use.

According to the present invention, a temperature indicating device comprises a plurality of panels in a given array, each of which panels is adapted to undergo remotely detectable change in its appearance at a given temperature, said panels being divided into first and second groups, each of the panels in said first group being adapted to undergo a reversible change in its appearance at a given temperature which differs from the temperatures at which the remaining panels in said first groups change, and each of the panels in said second group being adapted to undergo an irreversible change in its appearance at a given temperature which differs from the temperatures at which the remaining panels in said second group change.

The invention will now be described, by way of example, with reference to the accompanying drawing which is a view of a temperature indicating device in accordance with the present invention.

During the encapsulation process drums containing the waste material are enclosed within a cell which prevents the escape of ionising radiation. However prior to the drums being located within the cell, each has a temperature indicating device in accordance with the present invention attached to its exterior surface. The device which is generally indicated at 10 in the drawing, is in sheet form and is attached by a suitable adhesive to the drum exterior in such a manner that it is visible through an inspection window provided in the wall of the cell.

The device 10 comprises a plurality of panels 11 in a fixed array or configuration which are adapted to undergo a change in their appearance at given temperatures. The panels 11 are divided into two groups A and B, the panels in group A being in the upper region of the device 10 as viewed in FIG. 1 and the panels 11 in groups B being in the lower region.

Each of the panels 11 in group A is adapted to undergo an irreversible change in appearance at a given temperature such as between 10° C. and 90° C. This is achieved by the use of panels 11 which comprise a film of wax or other suitable substance which is known to melt at a given temperature, on an absorbent surface, such as paper. The wax, which presents a white appearance, melts at the appropriate temperature and is absorbed by the absorbent surface so that the colour of the absorbent surface, which is chosen to contrast with that of the wax, becomes visible. It will be appreciated however that the panels 11 could be made from other substances which undergo an irreversible change in appearance at a given temperature. Thus, for instance use could be made of so-called thermal paints which include pigments which change colour at a given temperature.

The panels 11 in group A are so arranged that they each change in appearance at a different temperature. Thus the panels 11 sequentially change in appearance at about 10° C. intervals as the temperature increases from ambient to 90° during the encapsulation process. It will be seen therefore that the panels 11 in group A provide an indication of the maximum temperature which has been reached during the encapsulation process. This being so inspection of the panels 11 in Group A will, from a prior knowledge of the nature of the exothermic reaction characteristic of the encapsulation process, provide an indication of whether the peak temperature has been reached and consequently whether the exothermic encapsulation reaction has finished.

Each of the panels 11 in group B is adapted to undergo a reversible change in its appearance at a given temperature. This is achieved by using a liquid crystal material in the construction of the group B panels 11. However other suitable materials could be used if so desired.

As in the case of the group A panels 11, the group B panels 11 are so arranged that they change in appearance at different temperatures. Consequently the group B panels 11 sequentially change in appearance at about 10° C. intervals as the temperature ranges between ambient and 60° C. It will be seen therefore that inspection of the panels 11 in group B will provide an indication of the actual temperature of the drums at any given time. Thus inspection of the panels 11 in group B provides an indication as to whether the drums containing the encapsulated waste material are sufficiently cool to be removed from the cell in which they are enclosed as well as additional confirmation that the exothermic encapsulation reaction has been completed.

Summarising therefore, inspection of the temperature indicating device 10 at any time during the encapsulation process provides an indication of whether the exothermic reaction has been completed and whether the drums are sufficiently cool to be removed from the cell in which they are enclosed.

Although the progress of the exothermic reaction may be monitored simply by visually inspecting the temperature indicating device 10, the fact that the panels 11 are in a fixed array means that a simple pattern recognition device could be used to monitor progress. Thus the pattern recognition device which could be a television system or other similar apparatus would be situated externally of the cell viewing the device 10 through a suitable window.

The temperature indicating device 10 is cheap and simple to produce so that it may be discarded after use. This being so, there is no need for expensive temperature monitoring equipment to be present in the cell in which encapsulation takes place.

Although the present invention has been described with reference to the monitoring of the encapsulation process for waste radioactive materials, it will be readily appreciated that it could be used in other situations in which the actual temperature and the maximum temperature achieved of an object in hazardous environment needs to be monitored or where there is a need to monitor exothermic reactions with very low cost devices, such as those associated with large cast concrete load bearing structures.

We claim:

1. A temperature indicating device comprising a plurality of panels in a given array, each of which panels is adapted to undergo a remotely detectable change in its appearance at a given temperature, said panels being divided into first and second groups, each of the panels in said first group being adapted to undergo a reversible change in its appearance at a given temperature which differs from the temperatures at which the remaining panels in said first group change, and each of the panels in said second group being adapted to undergo an irreversible change in its appearance at a given temperature which differs from the temperatures at which the remaining panels in said second group change.

2. A temperature indicating device as claimed in claim 1 wherein said device is in the form of a sheet.

3. A temperature indicating device as a claimed in claim 2 wherein said sheet is adapted to be adhesively attached to an object, the temperature of which is to be indicated.

4. A temperature indicating device as claimed in claim 1 wherein said given array of said panels is such as can be identified by a pattern recognition device.

5. A temperature indicating device as claimed in claim 1 wherein each of said panels in said first group adapted to undergo a reversible change in appearance comprises an appropriate liquid crystal material.

6. A temperature indicating device as claimed in claim 1 wherein said panels in said second group adapted to undego an irreversible change in appearance comprise a wax film of appropriate melting point on an appropriately contrastingly coloured absorbent surface.

* * * * *